United States Patent
Wang et al.

(10) Patent No.: US 9,397,577 B2
(45) Date of Patent: Jul. 19, 2016

(54) SWITCHING MODE POWER SUPPLIES WITH PRIMARY SIDE REGULATION AND ASSOCIATED METHODS OF CONTROL

(71) Applicant: Chengdu Monolithic Power Systems Co., Ltd., Chengdu (CN)

(72) Inventors: Siran Wang, Hangzhou (CN); Yuancheng Ren, Hangzhou (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 0 days.

(21) Appl. No.: 14/601,791

(22) Filed: Jan. 21, 2015

(65) Prior Publication Data

US 2015/0207420 A1   Jul. 23, 2015

(30) Foreign Application Priority Data

Jan. 21, 2014   (CN) .......................... 2014 1 0026068

(51) Int. Cl.
*H02M 3/335* (2006.01)

(52) U.S. Cl.
CPC ................................ *H02M 3/33507* (2013.01)

(58) Field of Classification Search
CPC .............. H02M 3/3376; H02M 3/335; H02M 3/33523; H02M 3/33592; H02M 3/33507; H02M 7/1557; Y02B 70/126; G05F 1/33
USPC ................. 363/17, 21.04, 21.1, 21.11, 21.12, 363/21.14, 21.15–21.18, 21.06, 84, 88, 363/89–90
See application file for complete search history.

(56) References Cited

U.S. PATENT DOCUMENTS

| | | | |
|---|---|---|---|
| 2015/0103569 A1 | 4/2015 | Zhang et al. | |
| 2015/0124495 A1* | 5/2015 | Kong | H02M 3/33592 363/21.14 |
| 2015/0146457 A1* | 5/2015 | Strijker | H02M 1/08 363/21.14 |
| 2015/0180359 A1* | 6/2015 | Gong | H02M 3/33592 363/21.14 |

* cited by examiner

*Primary Examiner* — Nguyen Tran
(74) *Attorney, Agent, or Firm* — Perkins Coie LLP

(57) ABSTRACT

A switching mode power supply (SMPS) includes a transformer having a primary winding, a secondary winding for providing an output voltage and an auxiliary winding, a primary switch coupled to the primary winding, a secondary rectifying diode coupled to the secondary winding and a secondary switch connected in parallel with the secondary rectifying diode. A control method used in the SMPS includes: comparing a voltage across the secondary switch with a first secondary threshold and a second secondary threshold and generating a hysteresis comparison signal; timing based on the hysteresis comparison signal; comparing the voltage across the secondary switch with a third secondary threshold when the timing period reaches a first predetermined time; turning ON the secondary switch when the voltage across the secondary switch is less than a third secondary threshold; and turning on the primary switch when the conduction of the secondary switch is detected.

20 Claims, 14 Drawing Sheets

US 9,397,577 B2

SWITCHING MODE POWER SUPPLIES WITH PRIMARY SIDE REGULATION AND ASSOCIATED METHODS OF CONTROL

CROSS-REFERENCE TO RELATED APPLICATION(S)

This application claims the benefit of CN application 201410026068.7, filed on Jan. 21, 2014, and incorporated herein by reference.

TECHNICAL FIELD

The present invention generally relates to electronic circuits, and more particularly, relates to switching mode power supplies with primary side regulation and control methods thereof.

BACKGROUND

Switching mode power supplies with primary side regulation are widely used in cell phone chargers, adapters for handheld electronics and auxiliary power supplies because of its good features. The key of the primary side regulation is output voltage and load condition can be sensed by accurate sampling a voltage across an auxiliary winding. However, for conventional primary side regulation, the output voltage and the load condition can be detected only during the conduction period of the secondary rectifying diode. This feature results in unqualified dynamic load response, especially when the switching mode power supply is operating with lower switching frequency.

FIG. 1 illustrates several working waveforms of a prior art switching mode power supply which operates in discontinuous conduction mode. As shown in FIG. 1, wherein Ip represents a current flowing through a primary switch, IS represents a current flowing through a secondary rectifying diode, VO represents an output voltage provided to a load, IO represents a load current, and Vaux represents a voltage across an auxiliary winding. Generally, the operation of the switching mode power supply are described as follows:

(1) During the time period D1, the primary switch is turned ON, the current IP flowing through the primary switch increases linearly from zero to a peak value Ilim. The energy is drawn from the input and stored in a primary winding of a transformer.

(2) During the time period D2, the primary switch is turned OFF, the energy stored in the primary winding forces the secondary rectifying diode to be turned ON. The output voltage and the forward voltage of the secondary rectifying diode are reflected to the auxiliary winding. At the end of the time period D2, all the energy stored in the primary winding has been delivered to the output.

(3) During the time period D3, the current IS flowing through the secondary rectifying diode diminishes to zero, the energy stored in the transformer also reaches zero. One skilled in the relevant art will recognize that "the time period D3" is the discontinuous conduction time period of the switching mode power supply.

As shown in FIG. 1, when the load current IO increases during the time period D3, the output voltage VO decreases accordingly. However, the voltage Vaux across the auxiliary winding can not reflect the output voltage and the load condition during this time period D3. The output voltage and the load condition can NOT be detected until the time period D2 of the next switching cycle. This leads to a large undershoot at the output voltage since the time period D3 is too long especially in light load or no load conditions. The overall system efficiency is reduced.

SUMMARY

The embodiments of the present invention are directed to a switching mode power supply comprising a transformer having a primary winding, a secondary winding for providing an output voltage and an auxiliary winding, a primary switch coupled to the primary winding, a secondary rectifying diode coupled to the secondary winding, a secondary switch connected in parallel with the secondary rectifying diode, a feedback circuit coupled to the auxiliary winding to receive a voltage across the auxiliary winding and configured to generate a feedback signal based on the voltage across the auxiliary winding, a primary controller coupled to the feedback circuit to receive the feedback signal and configured to generate a primary control signal to control the primary switch, a secondary controller configured to generate a secondary control signal to control the secondary switch based on a voltage across the secondary switch. The primary controller turns ON the primary switch when the conduction of the secondary switch is detected. The secondary controller comprises: a hysteresis comparison circuit configured to compare the voltage across the secondary switch with a first secondary threshold and a second secondary threshold and configured to generate a hysteresis comparison signal, a secondary timer coupled to the hysteresis comparison circuit and configured to generate a secondary enable signal based on the hysteresis comparison signal, a first secondary comparator configured to compare the voltage across the secondary switch with a third secondary threshold under the control of the secondary enable signal and generate a first secondary comparison signal, and a secondary logic circuit configured to generate the secondary control signal based on the first secondary comparison signal and the secondary enable signal.

BRIEF DESCRIPTION OF THE DRAWINGS

Non-limiting and non-exhaustive embodiments are described with reference to the following drawings. The drawings are only for illustration purpose.

The use of the same reference label in different drawings indicates the same or like components.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 1:
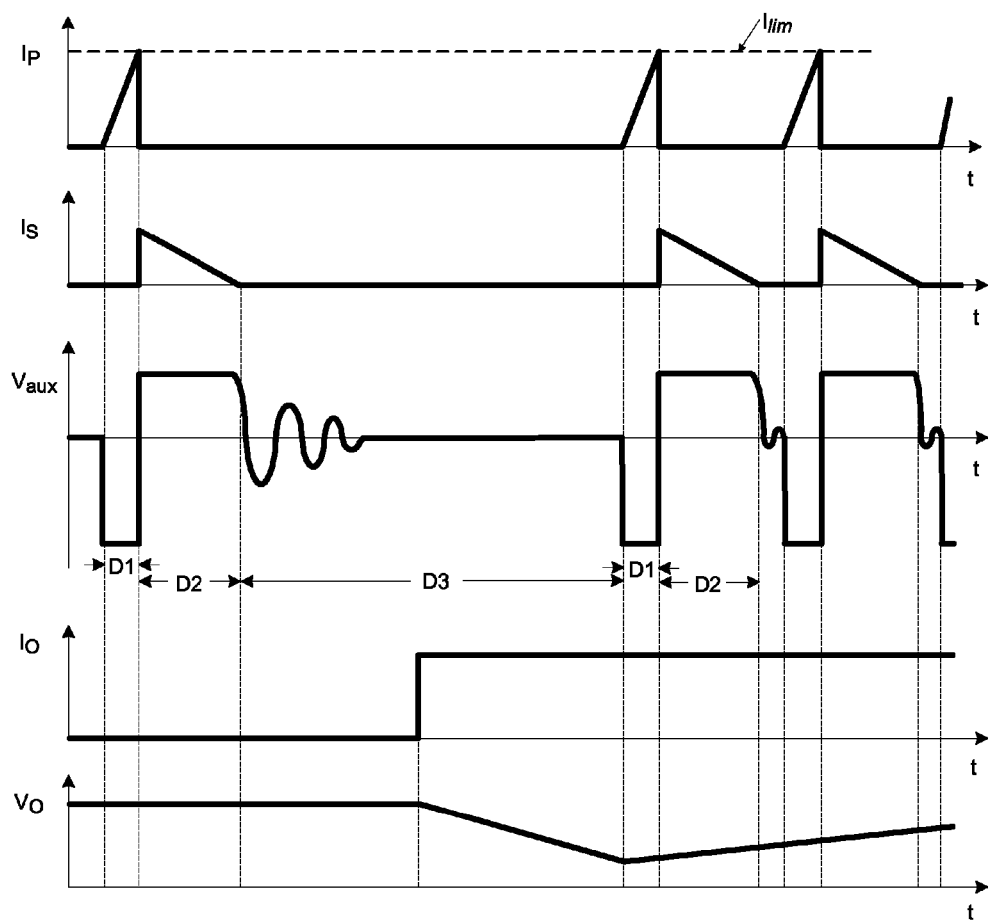
FIG. 1 illustrates several working waveforms of a prior art switching mode power supply which operates in discontinuous conduction mode.
Figure 2:
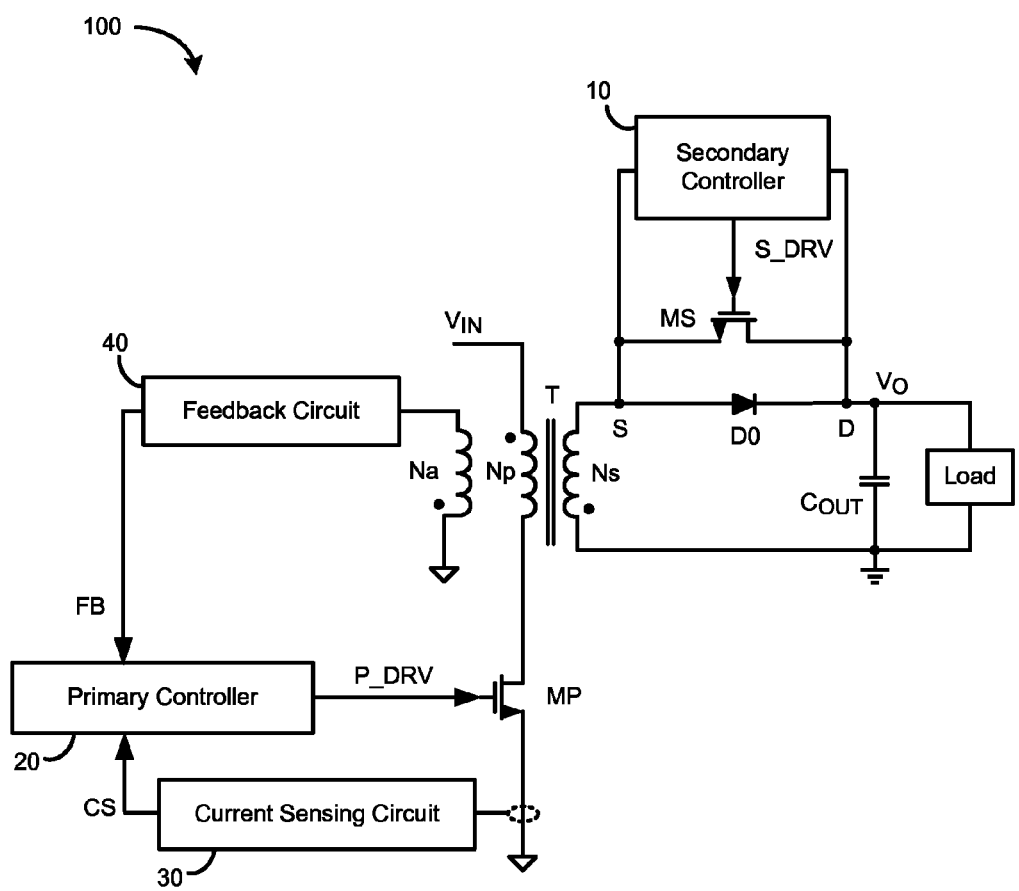
FIG. 2 illustrates a schematic circuitry diagram of a switching mode power supply 100 with primary side regulation according to an embodiment of the present invention.

FIG. 2 illustrates a schematic circuitry diagram of a switching mode power supply 100 with primary side regulation according to an embodiment of the present invention. As shown in FIG. 2, the switching mode power supply 100 comprises a transformer T, a primary switch MP, a secondary rectifying diode D0, a secondary switch MS, a secondary controller 10, a primary controller 20 and a feedback circuit 40. The transformer T has a primary winding Np, a secondary winding Ns and an auxiliary winding Na, wherein the primary winding Na is coupled to receive an input voltage VIN, the secondary winding Ns is coupled to a load to provide an output voltage VO. The primary switch MP is coupled to the primary winding Np, the secondary rectifying diode D0 is coupled to the secondary winding Ns, the secondary switch MS is connected in parallel with the secondary rectifying diode D0.

The feedback circuit 40 is coupled to the auxiliary winding Na to receive a voltage Vaux across the auxiliary winding Na, and wherein based on the voltage Vaux, the feedback circuit 40 generates a feedback signal FB. In one embodiment, the feedback circuit 40 comprises a resistor divider. The primary controller 20 is coupled to the feedback circuit 40 to receive the feedback signal FB, and is configured to generate a primary control signal P_DRV to control the primary switch MP. The secondary controller 10 is configured to generate a secondary control signal S_DRV to control the secondary switch MS based on a voltage VDS across the secondary switch MS.

The secondary controller 10 is configured to judge whether the load increases during the discontinuous conduction time period of the switching mode power supply 100 based on the voltage VDS across the secondary switch MS. If the result is "yes", the secondary controller 10 will turn ON the secondary switch MS. The primary controller 20 turns ON the primary switch MP when the conduction of the secondary switch MS is detected In an embodiment, the switching mode power supply 100 further comprises a current sensing circuit 30 configured to generate a current sensing signal CS indicative of a current flowing through the primary switch MP.

Figure 3:
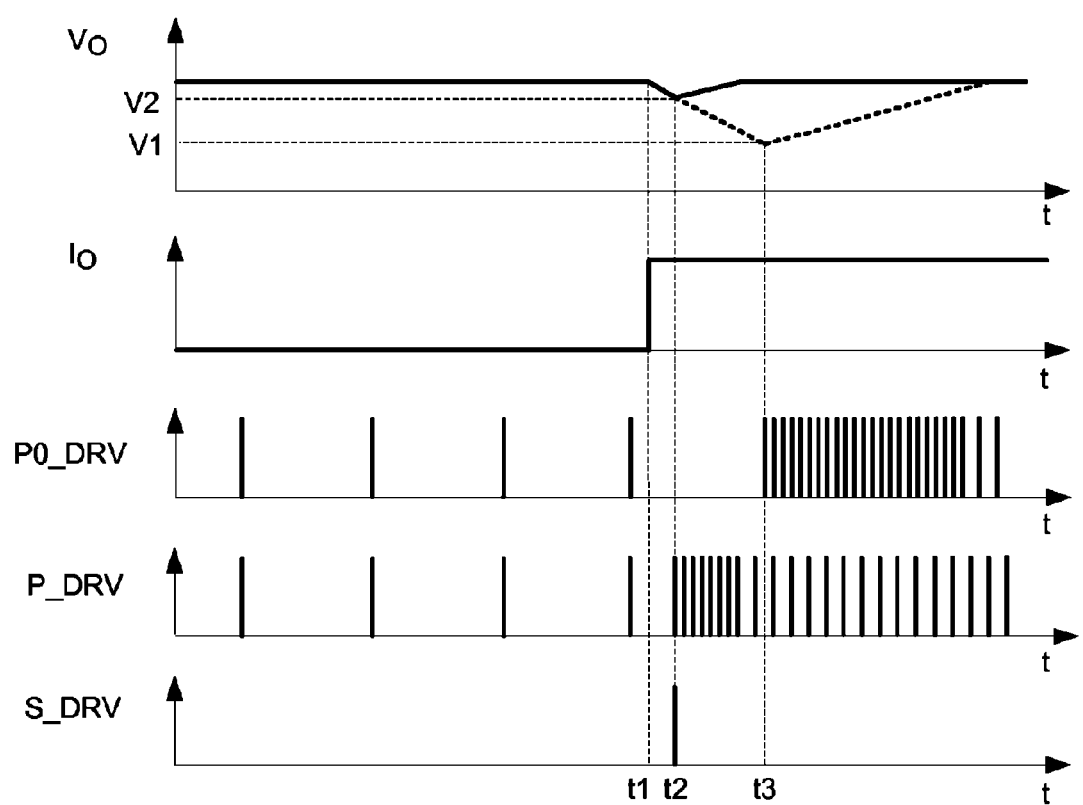
FIG. 3 illustrates a schematic waveform diagram of the switching mode power supply 100 shown in FIG. 2 compared with that of the prior art.

FIG. 3 illustrates a schematic waveform diagram of the switching mode power supply 100 shown in FIG. 2 compared with that of the prior art. As shown in FIG. 3, wherein P0_DRV represents a prior primary control signal P0_DRV for controlling the primary switch, P_DRV represents the primary control signal P_DRV according to an embodiment of the present invention. Before time point t1, the switching power supply works in light load condition, the switching cycles of two primary control signals P0_DRV and P_DRV are rather long. At time point t1, the load current IO increases, and the output voltage VO drops.

In the prior art, the output voltage VO decreases from an original voltage to a voltage V1 during the time period t1~t3, since the load current IO increase and output voltage VO undershoot can NOT be detected by the primary side until time point t3. It can be seen that the output voltage VO undershoot is too large and the period during which the output voltage VO backs to the original voltage is too long. On the contrast, according to an embodiment of the present invention, when the output voltage VO deceases to reach a voltage V2 at time point t2, the secondary controller 10 can detect that the voltage VDS across the secondary switch MS is less than a threshold and generate the secondary control signal S_DRV to turn ON the secondary switch MS. Once detecting the conduction of the secondary switch MS, the primary controller 20 turns ON the primary switch MP and ends the discontinuous conduction time period. The period during which the output voltage VO backs to the original voltage can de reduced. Therefore, compared with the prior art, the embodiments of the present invention can significantly reduce the output voltage undershoot and accelerate the response to load increase during the discontinuous conduction time period, which improves the switching mode power supply's performance on dynamic load response.

Figure 4:
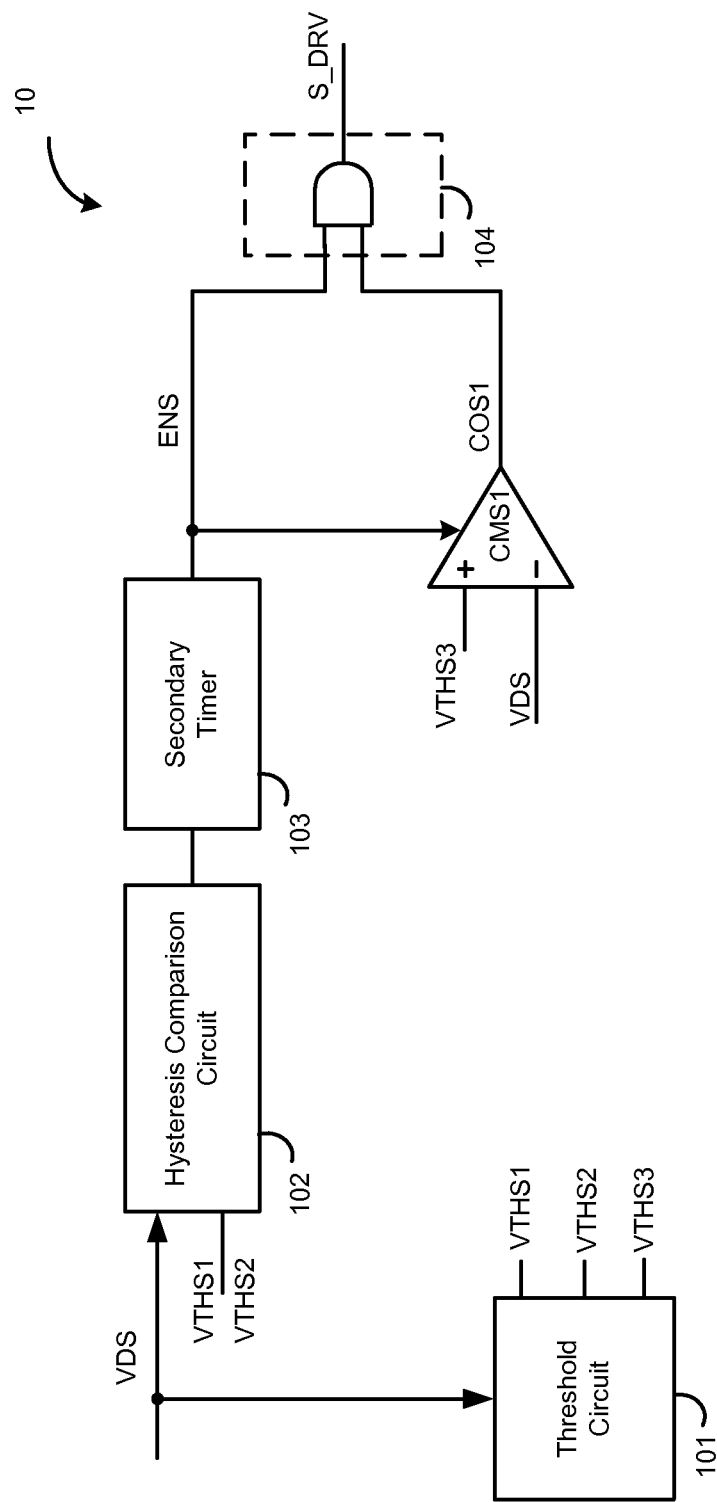
FIG. 4 illustrates a schematic circuitry diagram of a secondary controller 10 according to one embodiment of the present invention.

FIG. 4 illustrates a schematic circuitry diagram of a secondary controller 10 according to one embodiment of the present invention. In the embodiment of FIG. 4, the secondary controller 10 comprises a threshold circuit 101, a hysteresis comparison circuit 102, a secondary timer 103, a first secondary comparator CMS1 and a secondary logic circuit 104. As shown in FIG. 4, the threshold circuit 101 is configured to convert the voltage VDS across the secondary switch MS into a first secondary threshold VTHS1, a second secondary threshold VTHS2 and a third secondary threshold VTHS3. The hysteresis comparison circuit 102 has a first input terminal, a second input terminal and an output terminal, wherein the first input terminal is configured to receive the voltage VDS across the secondary switch MS, the second input terminal is configured to receive the first secondary threshold VTHS1 and the second secondary threshold VTHS2, the hysteresis comparison circuit 102 compares the voltage VDS across the secondary switch MS with the first secondary threshold VTHS1 and the second secondary threshold VTHS2 and generates a hysteresis comparison signal at the output terminal.

When the voltage VDS across the secondary switch MS is increased to reach the first secondary threshold VTHS1, the hysteresis comparison signal is activated, the secondary timer 103 starts to work and keeps timing. When the voltage VDS across secondary the switch MS is decreased to reach the second secondary threshold VTHS2, the hysteresis comparison signal is deactivated, the secondary timer 103 stops timing and clears the timing period. The secondary timer 103 has an input terminal and an output terminal, wherein the input terminal is configured to receive the hysteresis comparison signal, the secondary timer 103 generates a secondary enable signal ENS at the output terminal based on the hysteresis comparison signal and a first predetermined time td1.

The first secondary comparator CMS1 has an enable terminal, a first input terminal, a second input terminal and an output terminal, wherein the enable terminal is configured to receive the secondary enable signal ENS, the first input terminal is configured to receive the voltage VDS across the secondary switch MS, the second input terminal is configured to receive the third secondary threshold VTHS3, the first secondary comparator CMS1 compares the voltage VDS across the secondary switch MS with the third secondary threshold VTHS3 under the control of the secondary enable signal ENS and generates a first secondary comparison signal COS1 at the output terminal.

The secondary logic circuit 104 has a first input terminal, a second input terminal and an output terminal, wherein the first input terminal is coupled to the output terminal of the first secondary comparator CMS1 to receive the first secondary comparison signal COS1, the second input terminal is coupled to the output terminal of the secondary timer 103 to receive the secondary enable signal ENS, based on the first secondary comparison signal COS1 and the secondary enable signal ENS, the secondary logic circuit 104 generates the secondary control signal S_DRV at the output terminal.

Figure 5:
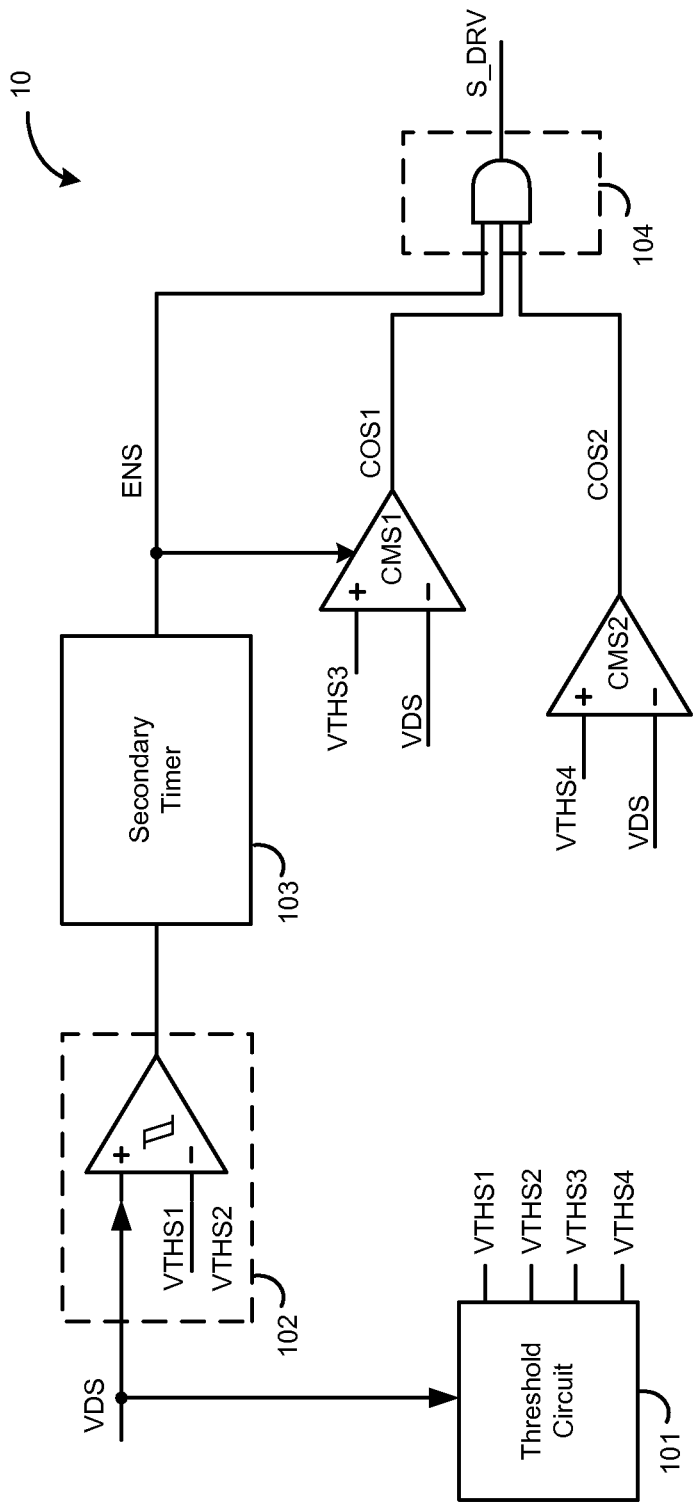
FIG. 5 illustrates a schematic circuitry diagram of a secondary controller 10 according to another embodiment of the present invention.

FIG. 5 illustrates a schematic circuitry diagram of a secondary controller 10 according to another embodiment of the present invention.

In the embodiment of FIG. 5, the threshold circuit 101 is further configured to convert the voltage VDS across the secondary switch MS into a fourth secondary threshold VTHS4. The hysteresis comparison circuit 102 comprises a hysteresis comparator. The hysteresis comparator has a non-inverting input terminal, an inverting input terminal and an output terminal, wherein the non-inverting input terminal is configured to receive the voltage VDS across the secondary switch MS, the inverting input terminal is configured to receive the first secondary threshold VTHS1 and the second secondary threshold VTHS2, The hysteresis comparator provides the hysteresis comparison signal. In other embodiments, the hysteresis comparison circuit 102 may be configured in other suitable circuit or structure.

The secondary controller 10 further comprises a second secondary comparator CMS2 having a first input terminal, a second input terminal and an output terminal, wherein the first input terminal is configured to receive the fourth secondary threshold VTHS4, the second input terminal is configured to receive the voltage VDS across the secondary switch MS, the second secondary comparator CMS2 compares the voltage across VDS the secondary switch MS with the fourth secondary threshold VTHS4 and generates a second secondary comparison signal COS2 at the output terminal. As shown in FIG. 5, based on the first secondary comparison signal COS1, the second secondary comparison signal COS2 and the secondary enable signal ENS, the secondary logic circuit 104 generates the secondary control signal S_DRV at the output terminal.

Figure 6:
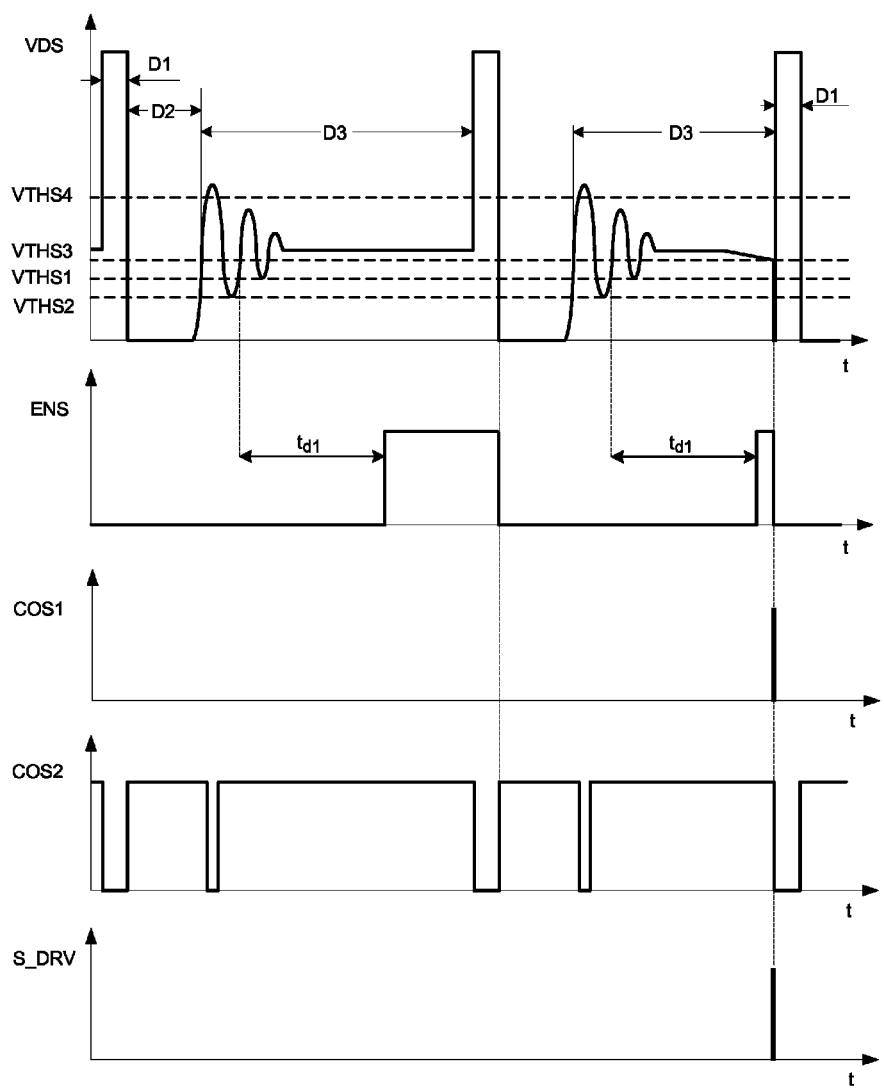
FIG. 6 illustrates a schematic waveform diagram of the secondary controller 10 shown in FIG. 5 according to an embodiment of the present invention.

FIG. 6 illustrates a schematic waveform diagram of the secondary controller 10 shown in FIG. 5 according to an embodiment of the present invention.

As shown in FIG. 6, when the timing period of the secondary timer 103 increases to reach the first predetermined time td1, the secondary enable signal ENS is activated and is high level. Otherwise, the secondary enable signal ENS is deactivated and is low level. When the secondary enable signal ENS is high level and the voltage VDS is less than the third secondary threshold VTHS3, the first secondary comparison signal COS1 transits in effective state of high level to turn ON the secondary switch MS. The conduction of the secondary switch MS makes the voltage VDS across the secondary switch MS be less than the second secondary threshold VTHS2, the secondary enable signal ENS is deactivated and is low level, so the first secondary comparison signal COS1 becomes low level again. When the voltage VDS across the secondary switch MS is larger than the fourth secondary threshold VTHS4, the second comparison signal COS2 is low level, and the secondary switch MS is turned OFF.

Figure 7:
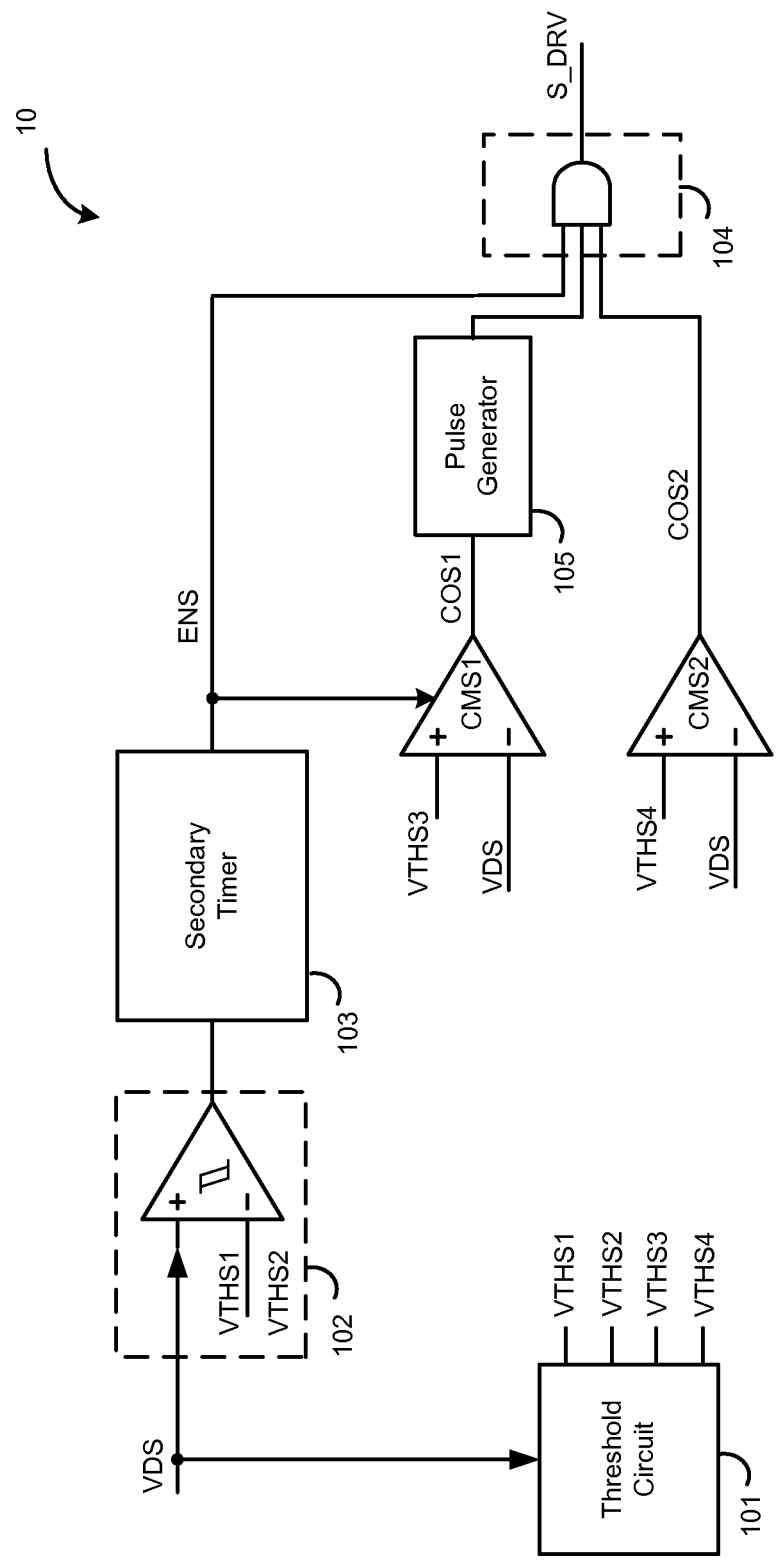
FIG. 7 illustrates a schematic circuitry diagram of a secondary controller 10 according to yet another embodiment of the present invention.

FIG. 7 illustrates a schematic circuitry diagram of a secondary controller 10 according to yet another embodiment of the present invention. In the embodiment of FIG. 7, the secondary controller 10 further comprises a pulse generator 105 configured to turn ON the secondary switch MS when the rising edge of the first secondary comparison signal COS1 is detected. The pulse generator 105 is coupled between the output terminal of the first secondary comparator CMS1 and the first input terminal of the secondary logic circuit 104. In an embodiment, the pulse generator 105 is configured to generate a single pulse signal. In another embodiment, the pulse generator 105 is configured to generate a series of digital pulses with fixed pulse width and fixed frequency.

Figure 8:
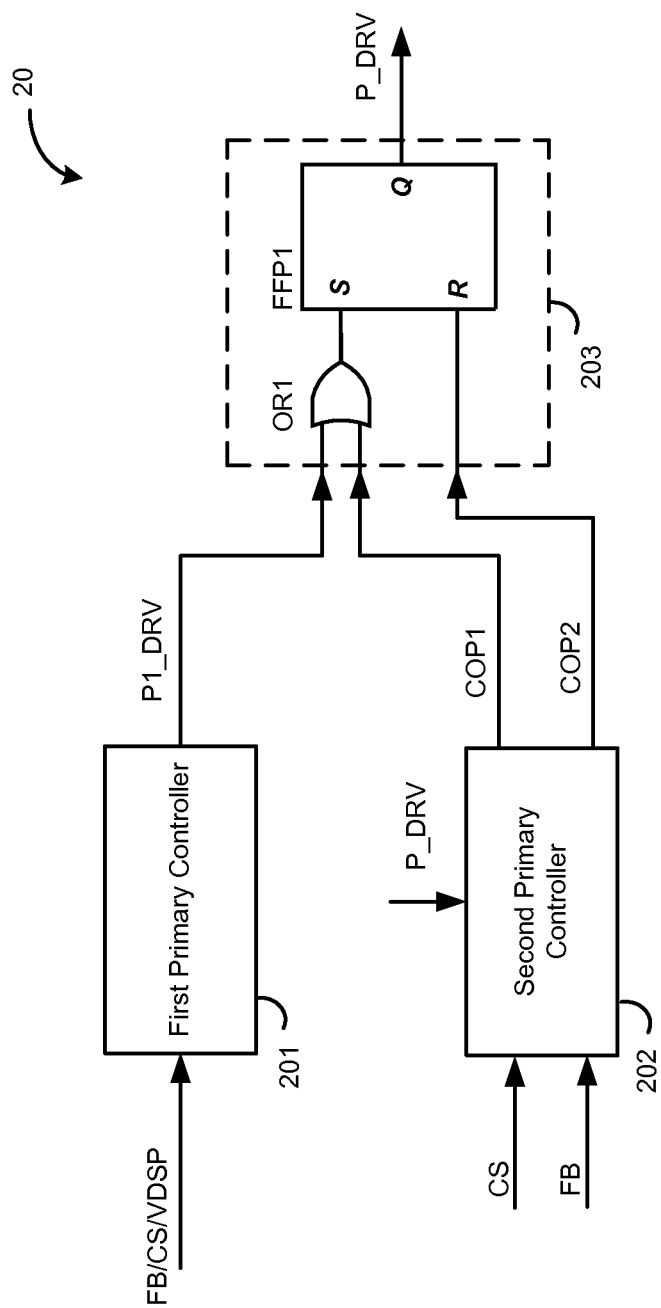
FIG. 8 illustrates a block diagram of a primary controller 20 according to an embodiment of the present invention.

FIG. 8 illustrates a block diagram of a primary controller 20 according to an embodiment of the present invention. The primary controller 20 comprises a first primary controller 201, a second primary controller 202 and a primary logic circuit 203.

The first primary controller 201 is configured to detect the conduction state of the secondary switch MS and generate a first primary control signal P1_DRV based on at least one of the current sensing signal CS, the feedback signal FB and a voltage VDSP across the primary switch MP.

The second primary controller 202 has a first input terminal, a second input terminal, a third input terminal, a first output terminal and a second output terminal, wherein the first input terminal is configured to receive the current sensing signal CS, the second input terminal is configured to receive the feedback signal FB, the third input terminal is configured to receive the primary control signal P_DRV, based on the current sensing signal CS, the feedback signal FB and the primary control signal P_DRV, the second primary controller 202 generates a first primary comparison signal COP1 at the first output terminal and a second primary comparison signal COP2 at the second output terminal.

The primary logic circuit 203 has a first input terminal, a second input terminal, a third input terminal and an output terminal, wherein the first input terminal is configured to receive the first primary comparison signal COP1, the second input terminal is configured to receive the second primary comparison signal COP2, the third input terminal is configured to receive the first primary control signal P1_DRV, based on the first primary comparison signal COP1, the second primary comparison signal COP2 and the first primary control signal P1_DRV, the primary logic circuit 203 generates the primary control signal P_DRV at the output terminal. In an embodiment, the primary logic circuit 203 comprises an OR gate OR1 and a flip-flop FFP1, as shown in FIG. 8.

If the load increases suddenly during the discontinuous conduction time period of the switching mode power supply 100, the secondary switch MS is turned ON by the secondary controller 10. And then the first primary controller 201 detects the conduction of the secondary switch MS and generates the first primary control signal P1_DRV which transits in effective state of high lever for turning ON the primary switch MP. Otherwise, the first primary control signal P1_DRV generated by the first primary controller 201 is at a low level.

Figure 9:
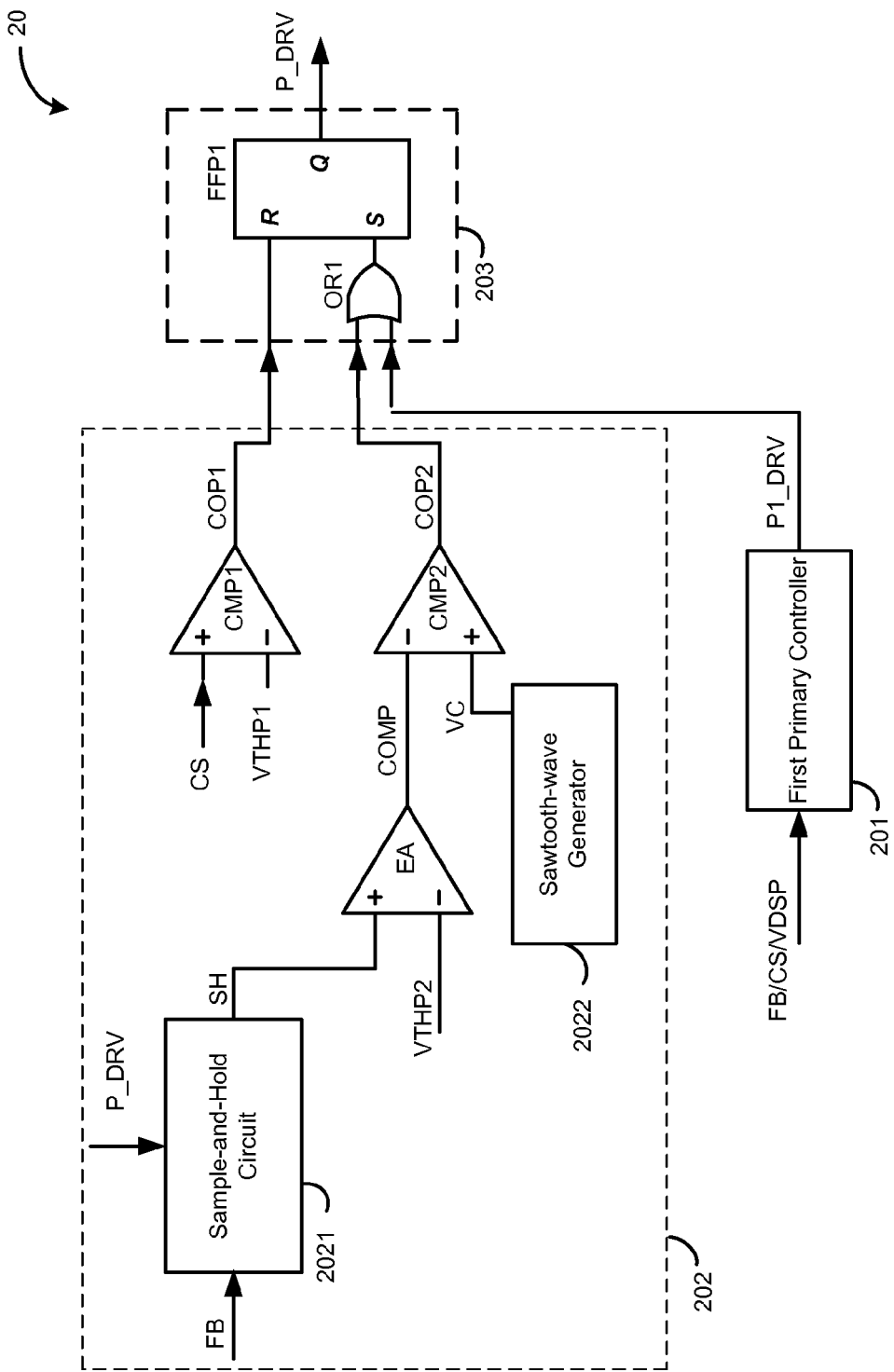
FIG. 9 illustrates a schematic circuitry diagram of a primary controller 20 according to an embodiment of the present invention.

FIG. 9 illustrates a schematic circuitry diagram of a primary controller 20 according to an embodiment of the present invention. In the embodiment of FIG. 9, the second primary controller 202 comprises a first primary comparator CMP1, a sample-and-hold circuit 2021, an error amplifier EA, a sawtooth-wave generator 2022 and a second primary comparator CMP2. The primary controller 20 shown in FIG. 9, together with the secondary controller 10, provides a simple and cost-effective primary side regulation.

The first primary comparator CMP1 has a non-inverting input terminal, an inverting input terminal and an output terminal, wherein the non-inverting input terminal is configured to receive the current sensing signal CS, the inverting input terminal is configured to receive a first primary threshold VTHP1, the first primary comparator CMP1 compares the current sensing signal CS with the first primary threshold VTHP1 and provides the first primary comparison signal COP1 at the output terminal based on the comparison. The sample-and-hold circuit 2021 has a first input terminal, a second input terminal and an output terminal, wherein the first input terminal is coupled the feedback circuit 40 to receive the feedback signal FB, the second input terminal is configured to receive the primary control signal P_DRV, the sample-and-hold circuit 2021 samples and holds the feedback signal FB under the control of the primary control signal P_DRV and generates a sample-and-hold signal SH at the output terminal.

The error amplifier EA has a non-inverting input terminal, an inverting input terminal and an output terminal, wherein the non-inverting input terminal is coupled to the output terminal of the sample-and-hold circuit 2021 to receive the sample-and-hold signal SH, the inverting input terminal is configured to receive a second primary threshold VTHP2, based on the sample-and-hold signal SH and the second primary threshold VTHP2, the error amplifier EA generates a compensation signal COMP at the output terminal. The sawtooth-wave generator 2022 is configured to generate a sawtooth-wave signal VC.

The second primary comparator CMP2 has a non-inverting input terminal, an inverting input terminal and an output terminal, wherein the non-inverting input terminal is configured to receive the sawtooth-wave signal VC, the inverting input terminal is configured to receive the compensation signal COMP, the second primary comparator compares the compensation signal COMP with the sawtooth-wave signal VC and generates the second primary comparison signal COP2 at the output terminal.

When the switching mode power supply 100 works in normal conditions, no matter the load is light or heavy, the error amplifier EA amplifies the error between the sample-and-hold signal SH and the second primary threshold VTHP2 and provides the compensation signal COMP. In each switching cycle, the sawtooth-wave signal VC increase from zero until the sawtooth-wave signal VC increases to reach the compensation signal COMP. And then the sawtooth-wave signal VC increase from zero again in the next switching cycle. At the end of each switching cycle, the second primary comparator CMP2 generates the second primary comparison signal COP2 which transits in effective state of high lever to set the flip-flop FFP1, the primary switch MP is turned ON, and the current sensing signal CS increases. When the current sensing signal CS increases to reach the first primary threshold VTHP1, the first primary comparator CMP1 provides the first primary comparison signal COP1 which transits in effective state of high lever to reset the flip-flop FFP1, the primary switch MP is turned OFF.

When the load current of the switching mode power supply 100 increases during the discontinuous conduction time period, the first primary controller 201 generates the first primary control signal P1_DRV which transits in effective state of high lever to set the a flip-flop FFP1, the primary switch MP is turned ON. This helps to respond to the load increase during the discontinuous conduction time period, reduces the output voltage undershoot and improves the performance on dynamic load response.

Figure 10:
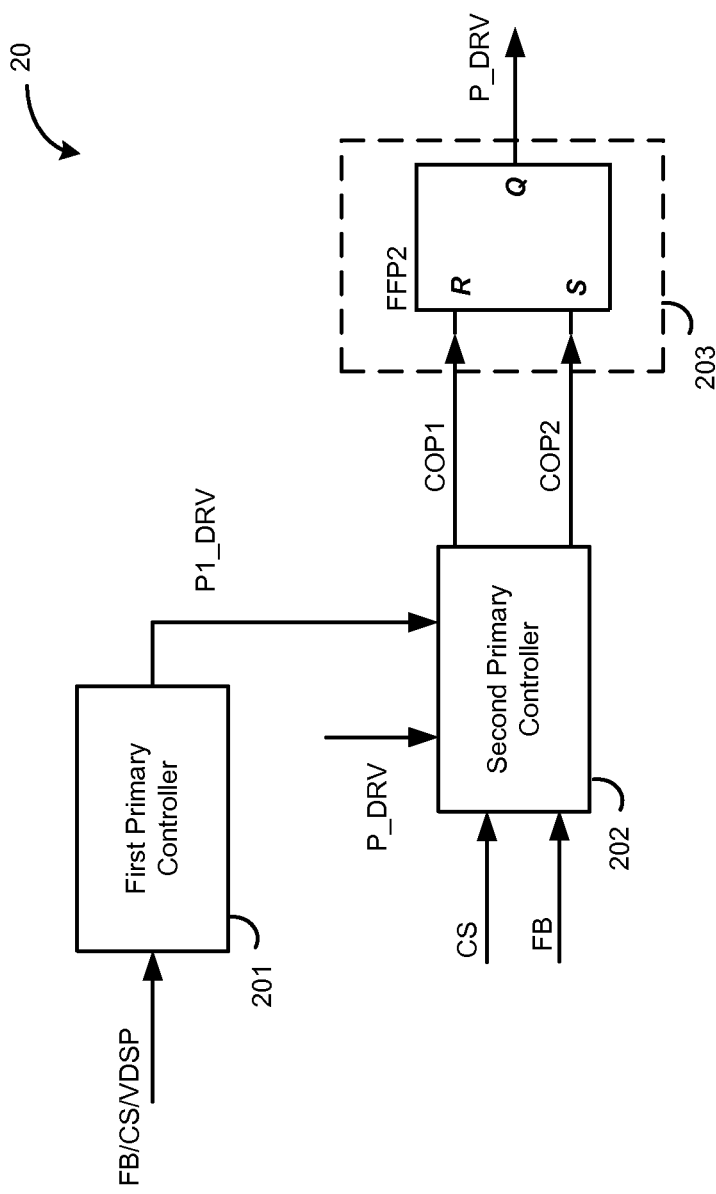
FIG. 10 illustrates a block diagram of a primary controller 20 according to another embodiment of the present invention.

FIG. 10 illustrates a block diagram of a primary controller 20 according to another embodiment of the present invention. In the embodiment of FIG. 10, the first primary controller 201 is configured to generate a first primary control signal P1_DRV by detecting the conduction state of the secondary switch MS. The second secondary controller 202 has a first input terminal, a second input terminal, a third input terminal, a fourth input terminal, a first output terminal and a second output terminal, wherein the first input terminal is configured to receive the current sensing signal CS, the second input terminal is configured to receive the feedback signal FB, the third input terminal is configured to receive the primary control signal P_DRV, the fourth input terminal is configured to receive the first primary control signal P1_DRV, wherein based on the current sensing signal CS, the feedback signal FB and the primary control signal P_DRV and the first primary control signal P1_DRV, the second secondary controller 202 generates the first primary comparison signal COP1 at the first output terminal and the second primary comparison signal COP2 at the second output terminal. The primary logic circuit 203 has a first input terminal, a second input terminal and an output terminal, wherein the first input terminal is configured to receive the first primary comparison signal COP1, the second input terminal is configured to receive the second primary comparison signal COP2, wherein based on the first primary comparison signal COP1 and the second primary comparison signal COP2, the primary logic circuit 203 generates the primary control signal P_DRV at the output terminal. In the embodiment of FIG. 10, the primary logic circuit 203 comprises a flip-flop FFP2.

Figure 11:
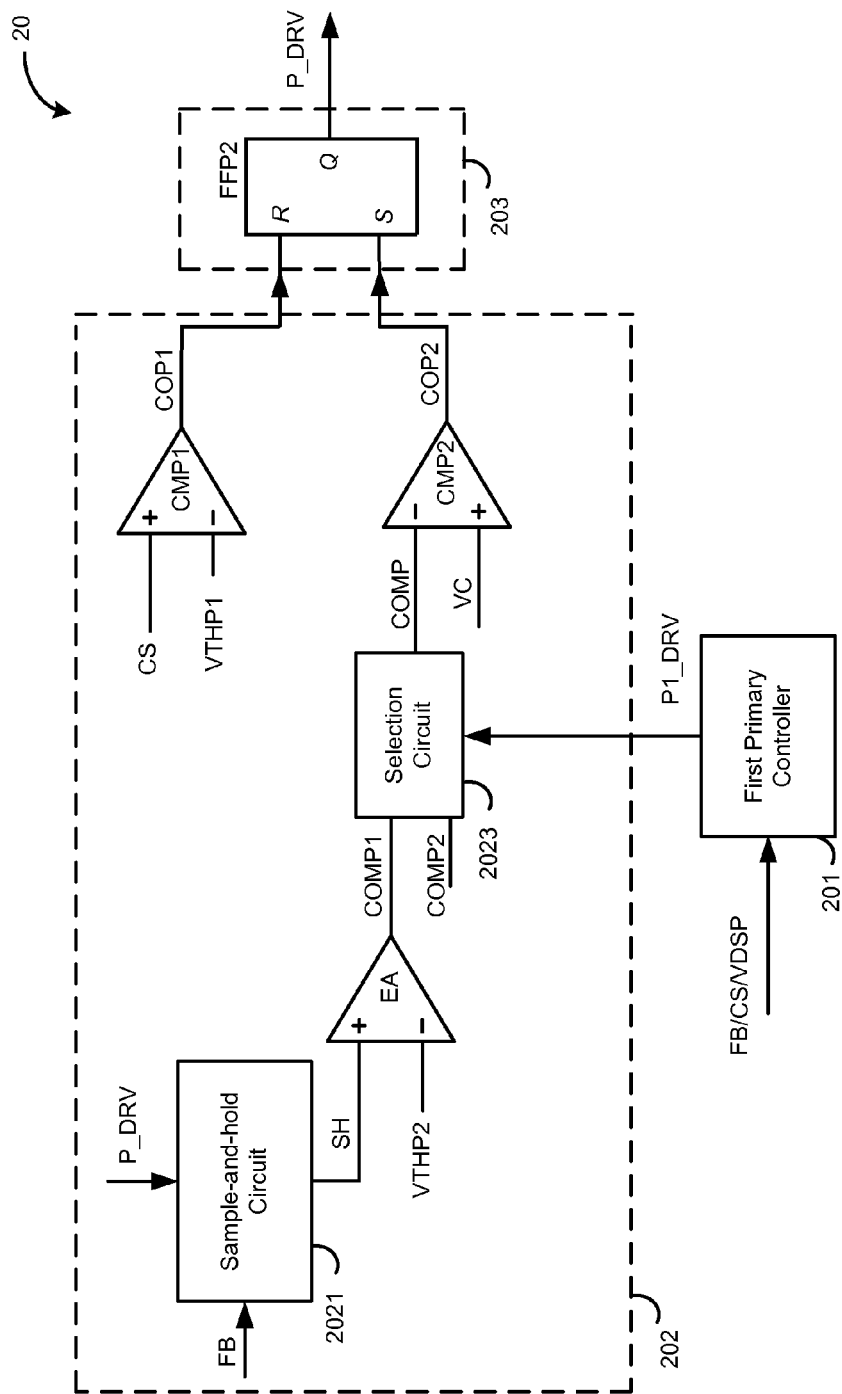
FIG. 11 illustrates a schematic circuitry diagram of a primary controller 20 according to another embodiment of the present invention.

FIG. 11 illustrates a schematic circuitry diagram of a primary controller 20 according to another embodiment of the present invention. In the embodiment of FIG. 11, the second primary controller 202 comprises a first primary comparator CMP1, a sample-and-hold circuit 2021, an error amplifier EA, a selection circuit 2023 and a second primary comparator CMP2. As shown in FIG. 11, the error amplifier EA generates a first compensation signal COMP1 at its output terminal. The selection circuit 2023 has a first input terminal, a second input terminal, a control terminal and an output terminal, wherein the first input terminal is coupled to the output terminal of the error amplifier EA to receive the first compensation signal COMP1, a second input terminal is configured to receive a preset compensation signal COMP2, the control terminal is configured to receive the first primary control signal P1_DRV, based on the first primary control signal P1_DRV, the selection circuit 2023 selects one of the first compensation signal COMP1 and the preset compensation signal COMP2 as a compensation signal COMP to the output terminal. In one embodiment, when the switching mode power supply 100 works in normal condition, no matter the load is light or heavy, the first primary control signal P1_DRV is maintained at low level, the selection circuit 2023 selects the first compensation signal COMP1 as the compensation signal COMP. When the load current increase during the discontinuous conduction time period of the switching mode power supply, the first primary control signal P1_DRV is at high level, the selection circuit 2023 selects the preset compensation signal COMP2 as the compensation signal COMP. In one embodiment, the preset compensation signal COMP2 is zero. In aother embodiment, the preset compensation signal COMP2 is a little larger than zero.

Compared with the primary controller 20 shown in FIG. 9, that shown in FIG. 11 is able to simultaneously accelerate the responding to the load increase during the discontinuous conduction time period of the switching mode power supply and reduce further the output voltage undershoot and achieve a higher efficiency.

The second primary controller 201, together with the primary logic circuit 203, applies off-time control. In other embodiment, the second primary controller 201 also applies any other suitable control method, such as quasi resonant control.

Figure 12:
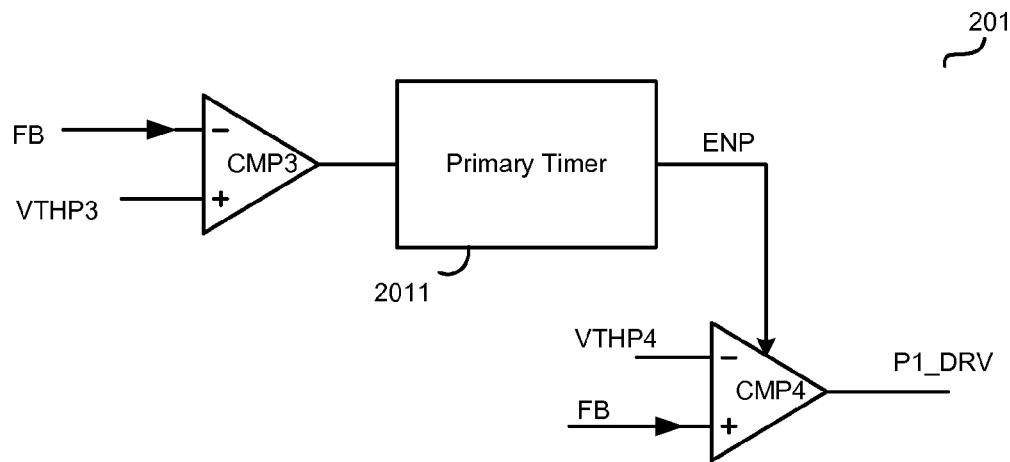
FIG. 12 illustrates a schematic circuitry diagram of a first primary controller 201 according to an embodiment of the present invention.

FIG. 12 illustrates a schematic circuitry diagram of a first primary controller 201 according to an embodiment of the present invention. As shown in FIG. 12, the first primary controller 201 comprises a third primary comparator CMP3, a primary timer 2011 and a fourth primary comparator CMP4. The third primary comparator CMP3 has a non-inverting input terminal, an inverting input terminal and an output terminal, wherein the non-inverting input terminal is configured to receive a third primary threshold VTHP3, the inverting input terminal is configured to receive the feedback signal FB, the third primary comparator CMP3 compares the feedback signal FB with the third primary threshold VTHP3 and generates a third primary comparison signal COP3 at the output terminal to enable or disenable the primary timer 2011. The primary timer 2011 has an input terminal and an output terminal, wherein the input terminal is configured to receive the third primary comparison signal COP3, based on the third primary comparison signal COP3 and a second predetermined time, the primary timer 2011 generates a primary enable signal ENP at the output terminal. When the third primary comparison signal COP3 is high level, the primary timer 2011 works and keeps timing; when the third primary comparison signal COP3 is low level, the primary timer 2011 stops timing and clears the timing period. If the timing period of the primary timer 2011 increases to reach the second predetermined time, the primary enable signal ENP transits in effective state of high level. The fourth primary comparator CMP4 has an enable terminal, a non-inverting input terminal, an inverting input terminal and an output terminal, wherein the enable terminal is configured to receive the primary enable signal ENP, the non-inverting input terminal is configured to receive the feedback signal FB, the inverting input terminal is configured to receive a fourth primary threshold VTHP4, the fourth comparator CMP4 compares the feedback signal FB with the fourth primary threshold VTHP4 under the control of the primary enable signal ENP and generates the primary control signal P1_DRV at the output terminal.

Figure 13:
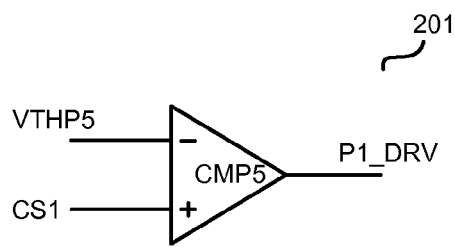
FIG. 13 illustrates a schematic circuitry diagram of a first primary controller 201 according to another embodiment of the present invention.

FIG. 13 illustrates a schematic circuitry diagram of a first primary controller 201 according to another embodiment of the present invention. In the embodiment of FIG. 13, the first primary controller 201 comprises a fifth comparator CMP5. The fifth primary comparator CMP5 has an a non-inverting input terminal, an inverting input terminal and an output terminal, wherein the non-inverting input terminal is configured to receive a primary current sensing signal CS1 indicative of a negative current flowing through the primary switch MP, the inverting input terminal is configured to receive a fifth primary threshold VTHP5, the fifth primary comparator compares the primary current sensing signal CS1 with the fifth primary threshold VTHP5 and generates the first primary control signal P1_DRV at the output terminal.

During the discontinuous conduction time period of the switching mode power supply, if the secondary switch MS is turned ON, a negative current will flow through the primary switch MP. When the primary current sensing signal CS1 indicative of the negative current flowing through the primary switch MP reaches the fifth primary threshold VTHP5, the first primary control signal P1_DRV transits in effective state of high level to turn ON the primary switch MP.

Figure 14:
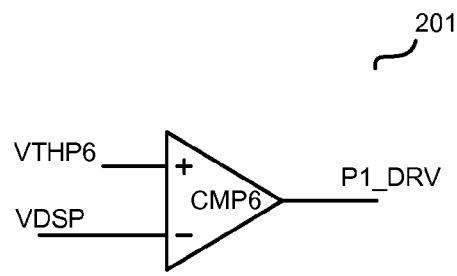
FIG. 14 illustrates a schematic circuitry diagram of a first primary controller 201 according to yet another embodiment of the present invention.

FIG. 14 illustrates a schematic circuitry diagram of a first primary controller 201 according to yet another embodiment of the present invention. The first primary controller 201 comprises a sixth primary comparator CMP6. The sixth primary comparator CMP6 has a non-inverting input terminal, an inverting input terminal and an output terminal, wherein the non-inverting input terminal is configured to receive a sixth primary threshold VTHP6, the inverting input terminal is configured to receive the voltage VDSP across the primary switch MP, the sixth comparator CMP6 compares the voltage VDSP across the primary switch MP with the sixth primary threshold VTHP6 and generates the primary control signal P1_DRV at the output terminal.

During the discontinuous conduction time period of the switching mode power supply, if the secondary switch MS is turned ON, a negative current will flow through the primary switch MP and the negative current discharges a buffer capacitor located across the primary switch MP, the voltage VDSP across the primary switch MP decreases accordingly. When the voltage VDSP across the primary switch MP decreases to reach the sixth primary threshold VTHP6, the sixth primary comparator CMP6 generates the first primary control signal P1_DRV which transits in effective state of high level to turn ON the primary switch MP.

In one embodiment, the secondary switch MS comprises a MOSFET. When the secondary switch MS is turned ON, it works in saturation mode, the maximum of the current flowing through the secondary switch MS is limited at a lower value, which is only under the control of the gate-to-source voltage VGS and is independent of the voltage VDS across the secondary switch MS. This current limiting method can protect the secondary switch MS from damage, also can reduce the output voltage undershoot. In other embodiment, the secondary switch MS may comprises any other suitable transistor.

In another embodiment, the secondary switch MS may be configured in discrete semiconductor device. In yet another embodiment, the secondary switch MS and the secondary controller 10 are integrated into one control chip with two pins which are connected respectively to the anode and cathode of the secondary rectifying diode DO. The control chip requires no additional external components. Together with the primary controller 20 discussed in the previous embodiment, the control chip provides a simple and cost-effective primary side regulation solution, which is able to simultaneously reduce no load power consumption and improve dynamic load response of the switching mode power supply.

Figure 15:
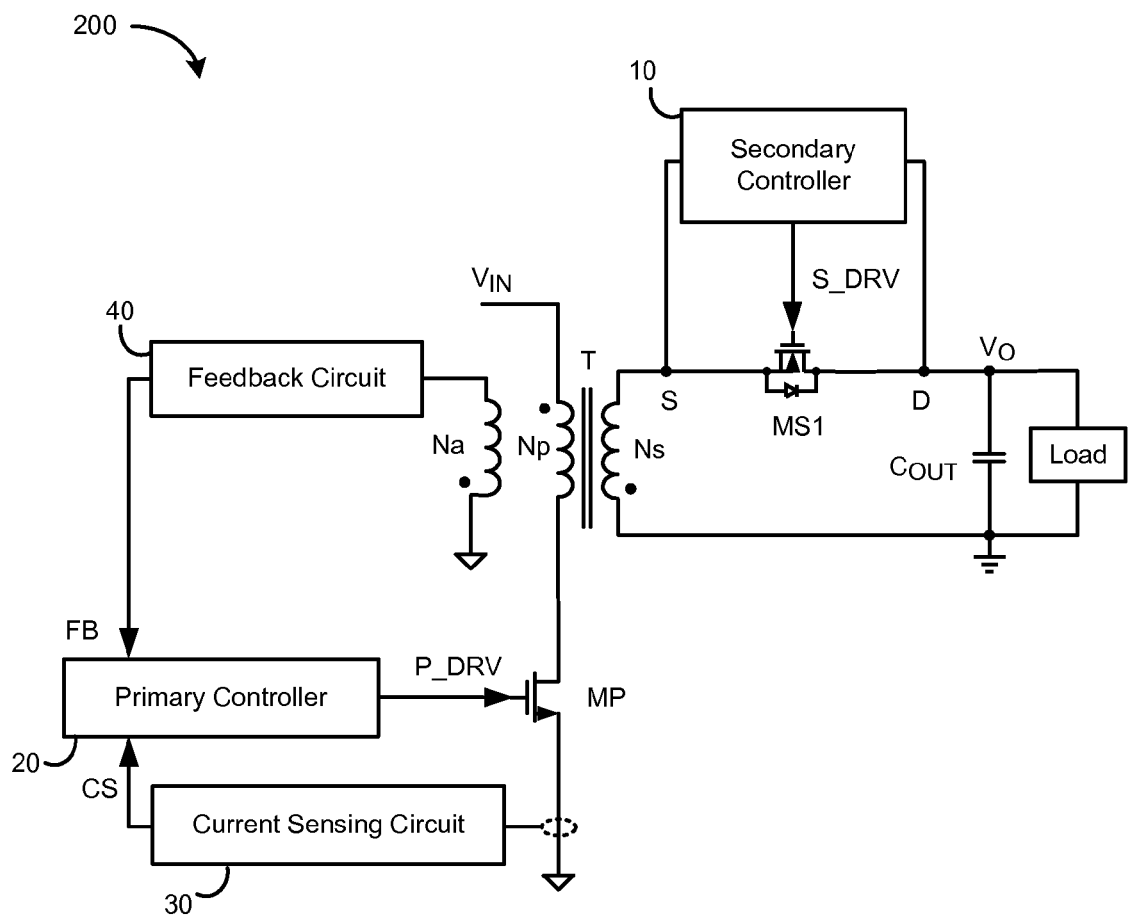
FIG. 15 illustrates a schematic circuitry diagram of a switching mode power supply 200 with primary side regulation according to another embodiment of the present invention.

FIG. 15 illustrates a schematic circuitry diagram of a switching mode power supply 200 with primary side regulation according to another embodiment of the present invention. Even though the previous embodiments of the present invention relates to the secondary switch MS and the secondary rectifying diode D0 connected in parallel with the secondary switch MS, it is appreciated that in other examples, as shown in FIG. 15, a synchronous rectifying switch MS1 and a body diode of the synchronous rectifying switch MS1 can also be applied in this invention.

Figure 16:
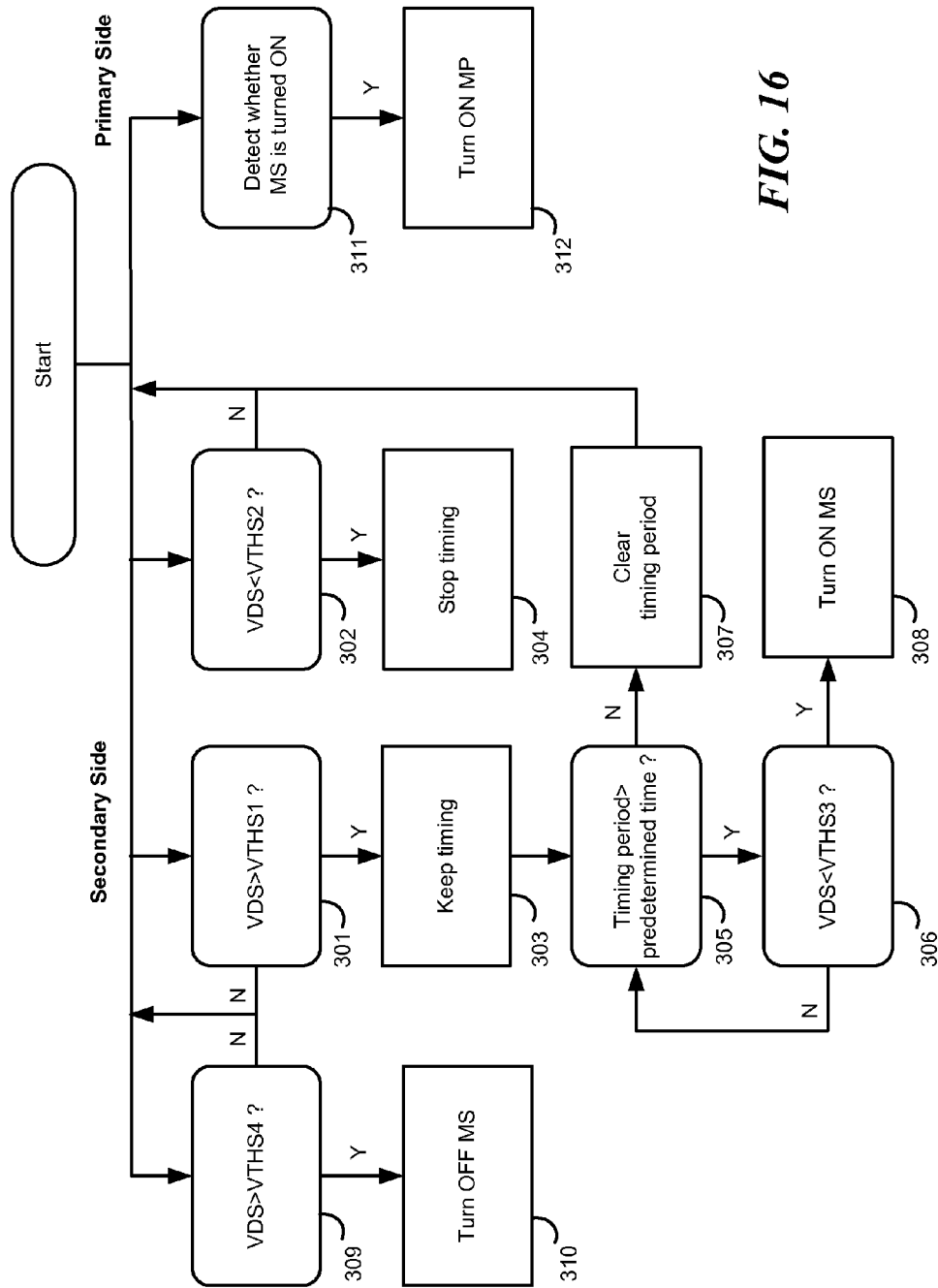
FIG. 16 illustrates a process flow diagram of a method for controlling a switching mode power supply with primary side regulation according to an embodiment of the present invention.

FIG. 16 illustrates a process flow diagram of a method for controlling a switching mode power supply with primary side regulation according to an embodiment of the present invention. The switching mode power supply comprises a transformer T having a primary winding Np, a secondary winding Ns and an auxiliary winding Na, a primary switch MP coupled to the primary winding Np, a secondary rectifying diode DO coupled to the secondary winding Ns and a secondary switch MS connected in parallel with the secondary rectifying diode D0, wherein the secondary winding Ns is coupled to a load to provide an output voltage, the control method comprises steps S301~S312.

At steps S301 and S302, a voltage VDS across the secondary switch MS is compared with a first secondary threshold VTHS1 and a second secondary threshold VTHS2 and a hysteresis comparison signal is generated.

At step S303, when the voltage VDS across the secondary switch MS is larger than the first secondary threshold VTHS1, the hysteresis comparison signal is activated, timing of a secondary timer is kept.

At step S304, when the voltage VDS across the secondary switch MS is less than the second secondary threshold VTHS2, the hysteresis comparison signal is deactivated, timing of the secondary timer is stopped.

At step S305, if the timing period of the secondary timer is larger than a first predetermined time, go to step S306, if the timing period of the secondary timer is less than the first predetermined time, go to step S307.

At step S306, the voltage VDS across the secondary switch MS is compared with a third secondary threshold VTHS3 to judge whether the voltage VDS across the secondary switch MS decreases to reach the third secondary threshold VTHS3. If the result is yes, go to step S308, else back to step S305.

At step S307, the timing period of the secondary timer is cleared.

At step S308, the secondary switch MS is turned ON.

At step S309, the voltage VDS across the secondary switch MS is compared with a fourth secondary threshold VTHS4. When the voltage VDS across the secondary switch MS decrease to reach the fourth secondary threshold VTHS4, go to step S310.

At step S310, the secondary switch MS is turned OFF.

At step S311, the conduction state of the secondary switch MS is detected.

At step S312, the primary switch MP is turned ON when the conduction of the secondary switch MS is detected.

In one embodiment, the control method further comprises: generating a feedback signal based on a voltage across the auxiliary winding; sensing a current flowing through the primary switch and generating a current sensing signal; comparing the current sensing signal with a first primary threshold and generating a first primary comparison signal; sampling and holding the feedback signal under the control of a primary control for controlling the primary switch and generating a sample-and-hold signal; amplifying an error between the sample-and-hold signal and a second primary threshold and generating a compensation signal; comparing the compensation signal with a sawtooth-wave signal and generating a second primary comparison signal; and generating the primary control signal based on the first primary comparison signal, the second primary comparison signal and the conduction state of the secondary switch.

In another embodiment, the control method further comprises: generating a feedback signal based on a voltage across the auxiliary winding; sensing a current flowing through the primary switch and generating a current sensing signal; comparing the current sensing signal with a first primary threshold and generating a first primary comparison signal; sampling and holding the feedback signal under the control of a primary control signal for controlling the primary switch and generating a sample-and-hold signal; amplifying an error between the sample-and-hold signal and a second primary threshold and generating a first compensation signal; selecting one of the first compensation signal and a preset compensation signal as a compensation signal based on the conduction state of the secondary switch; comparing the compensation signal with a sawtooth-wave signal and generating a second primary comparison signal; and generating the primary control signal based on the first primary comparison signal and the second primary comparison signal.

In an embodiment, the steps of detecting the conduction state of the secondary switch MS comprises: generating a feedback signal based on a voltage across the auxiliary winding; comparing the feedback signal with a third primary threshold and generating a third primary comparison signal; timing based on the third primary comparison signal; and comparing the feedback signal with a fourth primary threshold when the timing period of a primary timer reaches a second predetermined time.

In another embodiment, the step of detecting the conduction state of the secondary switch MS comprises comparing a primary current sensing signal indicative of a negative current flowing through the primary switch with a fifth primary threshold.

In yet another embodiment, the step of detecting the conduction state of the secondary switch MS comprises comparing a voltage across the primary switch with a sixth primary threshold.

Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

We claim:
1. A switching mode power supply, comprising:
 a transformer having a primary winding, a secondary winding and an auxiliary winding, wherein the secondary winding is coupled to a load to provide an output voltage;
 a primary switch coupled to the primary winding;

a secondary rectifying diode coupled to the secondary winding;

a secondary switch connected in parallel with the secondary rectifying diode;

a feedback circuit coupled to the auxiliary winding to receive a voltage across the auxiliary winding and configured to generate a feedback signal based on the voltage across the auxiliary winding;

a primary controller coupled to the feedback circuit to receive the feedback signal and configured to generate a primary control signal to control the primary switch;

a secondary controller configured to generate a secondary control signal to control the secondary switch based on a voltage across the secondary switch, and wherein the primary controller turns ON the primary switch when the conduction of the secondary switch is detected, the secondary controller comprises:

a hysteresis comparison circuit configured to compare the voltage across the secondary switch with a first secondary threshold and a second secondary threshold and configured to generate a hysteresis comparison signal;

a secondary timer coupled to the hysteresis comparison circuit and configured to generate a secondary enable signal based on the hysteresis comparison signal;

a first secondary comparator having an enable terminal, a first input terminal, a second input terminal and an output terminal, wherein the enable terminal is coupled to the secondary timer to receive the secondary enable signal, the first input terminal is configured to receive the voltage across the secondary switch, the second input terminal is configured to receive a third secondary threshold, and wherein the first secondary comparator compares the voltage across the secondary switch with the third secondary threshold under the control of the secondary enable signal and generates a first secondary comparison signal at the output terminal; and a secondary logic circuit coupled to the secondary timer and the first secondary comparator, wherein based on the first secondary comparison signal and the secondary enable signal, the secondary logic generates the secondary control signal.

2. The switching mode power supply of claim 1, wherein the secondary controller further comprises a second secondary comparator configured to turn OFF the secondary switch when the voltage across the secondary switch is larger a fourth secondary threshold.

3. The switching mode power supply of claim 1, wherein the secondary controller further comprises a pulse generator, the pulse generator is coupled to the output terminal of the first secondary comparator and configured to turn ON the secondary switch when the rising edge of the first secondary comparison signal is detected.

4. The switching mode power supply of claim 1, wherein the primary controller comprises:

a first primary controller configured to detect the conduction state of the secondary switch and generate a first primary control signal;

a second primary controller having a first input terminal, a second input terminal, a third input terminal, a first output terminal and a second output terminal, wherein the first input terminal is configured to receive a current sensing signal indicative of a current flowing through the primary switch, the second input terminal is configured to receive the feedback signal, the third input terminal is configured to receive the primary control signal, wherein based on the current sensing signal, the feedback signal and the primary control signal, the second primary controller generates a first primary comparison signal at the first output terminal and a second primary comparison signal at the second output terminal; and a primary logic circuit having a first input terminal, a second input terminal, a third input terminal and an output terminal, wherein the first input terminal is configured to receive the first primary comparison signal, the second input terminal is configured to receive the second primary comparison signal, the third input terminal is configured to receive the first primary control signal, and wherein based on the first primary comparison signal, the second primary comparison signal and the first primary control signal, the primary logic circuit generates the primary control signal at the output terminal.

5. The switching mode power supply of claim 4, wherein the second primary controller comprises:

a first primary comparator having a first input terminal, a second input terminal and an output terminal, wherein the first input terminal is configured to receive the current sensing signal, the second input terminal is configured to receive a first primary threshold, wherein the first primary comparator compares the current sensing signal with the first primary threshold and generates the first primary comparison signal at the output terminal;

a sample-and-hold circuit having a first input terminal, a second input terminal and an output terminal, wherein the first input terminal is coupled the feedback circuit to receive the feedback signal, the second input terminal is configured to receive the primary control signal, wherein the sample-and-hold circuit samples and holds the feedback signal under the control of the primary control signal and generates a sample-and-hold signal at the output terminal;

an error amplifier having a first input terminal, a second input terminal and an output terminal, wherein the first input terminal is coupled to the output terminal of the sample-and-hold circuit to receive the sample-and-hold signal, the second input terminal is configured to receive a second primary threshold, wherein based on the sample-and-hold signal and the second primary threshold, the error amplifier generates a compensation signal at the output terminal; and a second primary comparator having a first input terminal, a second input terminal and an output terminal, wherein the first input terminal is configured to receive the compensation signal, the second input terminal is configured to receive a sawtooth-wave signal, wherein the second primary comparator compares the compensation signal with the sawtooth-wave signal and generates the second primary comparison signal at the output terminal.

6. The switching mode power supply of claim 1, wherein the primary controller comprises:

a first primary controller configured to detect the conduction state of the secondary switch and generate a first primary control signal;

a second primary controller having a first input terminal, a second input terminal, a third input terminal, a first output terminal and a second output terminal, wherein the first input terminal is configured to receive a current sensing signal indicative of a current flowing through the primary switch, the second input terminal is configured to receive the feedback signal, the third input terminal is configured to receive the primary control signal, wherein based on the current sensing signal, the feedback signal and the primary control signal, the second primary controller generates a first primary comparison signal at the first output terminal and a second primary comparison signal at the second output terminal; and a primary logic circuit having a first input terminal, a second input terminal and an output terminal, wherein the first input terminal is configured to receive the first primary comparison signal, the second input terminal is configured to receive the second primary comparison signal, wherein based on the first primary comparison signal and the second primary comparison signal, the primary logic circuit generates the primary control signal at the output terminal.

7. The switching mode power supply of claim 6, wherein the second primary controller comprises:

a first primary comparator having a first input terminal, a second input terminal and an output terminal, wherein the first input terminal is configured to receive the current sensing signal, the second input terminal is configured to receive a first primary threshold, wherein the first primary comparator compares the current sensing signal with the first primary threshold and generates the first primary comparison signal at the output terminal;

a sample-and-hold circuit having a first input terminal, a second input terminal and an output terminal, wherein the first input terminal is coupled the feedback circuit to receive the feedback signal, the second input terminal is configured to receive the primary control signal, wherein the sample-and-hold circuit samples and holds the feedback signal under the control of the primary control signal and generates a sample-and-hold signal at the output terminal;

an error amplifier having a first input terminal, a second input terminal and an output terminal, wherein the first input terminal is coupled to the output terminal of the sample-and-hold circuit to receive the sample-and-hold signal, the second input terminal is configured to receive a second primary threshold, wherein based on the sample-and-hold signal and the second primary threshold, the error amplifier generates a first compensation signal at the output terminal;

a selection circuit having a first input terminal, a second input terminal, a control terminal and an output terminal, wherein the first input terminal is coupled to the output terminal of the error amplifier to receive the first compensation signal, a second input terminal is configured to receive a preset compensation signal, the control terminal is configured to receive the first primary control signal, wherein the selection circuit selects one of the first compensation signal and the preset compensation signal under the control of the first primary control signal as a compensation signal to the output terminal; and a second primary comparator having a first input terminal, a second input terminal and an output terminal, wherein the first input terminal is configured to receive the compensation signal, the second input terminal is configured to receive a sawtooth-wave signal, the second primary comparator compares the compensation signal with the sawtooth-wave signal and generates the second primary comparison signal at the output terminal.

8. The switching mode power supply of claim 6, wherein the first primary controller comprises:

a third primary comparator having a first input terminal, a second input terminal and an output terminal, wherein the first input terminal is configured to receive the feedback signal, the second input terminal is configured to receive a third primary threshold, wherein the third primary comparator compares the feedback signal with the third primary threshold and generates a third primary comparison signal at the output terminal;

a primary timer having an input terminal and an output terminal, wherein the input terminal is configured to receive the third primary comparison signal, the primary timer generates a primary enable signal at the output terminal based on the third primary comparison signal and a second predetermined time; and a fourth primary comparator having an enable terminal, a first input terminal, a second input terminal and an output terminal, wherein the enable terminal is configured to receive the primary enable signal, the first input terminal is configured to receive the feedback signal, the second input terminal is configured to receive a fourth primary threshold, wherein the fourth primary comparator compares the feedback signal with the fourth primary threshold under the control of the primary enable signal and generates the first primary control signal at the output terminal.

9. The switching mode power supply of claim 6, wherein the first primary controller comprises:

a fifth primary comparator having a first input terminal, a second input terminal and an output terminal, wherein the first input terminal is configured to receive a primary current sensing signal indicative of a negative current flowing through the primary switch, the second input terminal is configured to receive a fifth primary threshold, wherein the fifth primary comparator compares the primary current sensing signal with the fifth primary threshold and generates the first primary control signal at the output terminal.

10. The switching mode power supply of claim 6, wherein the first primary controller comprises:

a sixth primary comparator having a first input terminal, a second input terminal and an output terminal, wherein the first input terminal is configured to receive a sixth primary threshold, the second input terminal is configured to receive a voltage across the primary switch, wherein the sixth primary comparator compares the voltage across the primary switch with the sixth primary threshold and generates the first primary control signal at the output terminal.

11. The switching mode power supply of claim 1, wherein the secondary rectifying diode is the body diode of the secondary switch.

12. A control method used in a switching mode power supply, wherein the switching mode power supply comprises a transformer having a primary winding, a secondary winding for providing an output voltage and an auxiliary winding, a primary switch coupled to the primary winding, a secondary rectifying diode coupled to the secondary winding and a secondary switch connected in parallel with the secondary rectifying diode, the control method comprises:

comparing a voltage across the secondary switch with a first secondary threshold and a second secondary threshold and generating a hysteresis comparison signal;

timing based on the hysteresis comparison signal;

comparing the voltage across the secondary switch with a third secondary threshold when the timing period of a secondary timer reaches a first predetermined time;

turning ON the secondary switch when the voltage across the secondary switch is less than a third secondary threshold;

detecting whether the secondary switch is turned on; and turning on the primary switch when the conduction of the secondary switch is detected.

13. The control method of claim 12, further comprising turning OFF the secondary switch when the voltage across the secondary switch is larger than a fourth secondary threshold.

14. The control method of claim 12, further comprising:
generating a feedback signal based on a voltage across the auxiliary winding;
sensing a current flowing through the primary switch and generating a current sensing signal;
comparing the current sensing signal with a first primary threshold and generating a first primary comparison signal;
sampling and holding the feedback signal under the control of a primary control for controlling the primary switch and generating a sample-and-hold signal;
amplifying an error between the sample-and-hold signal and a second primary threshold and generating a compensation signal;
comparing the compensation signal with a sawtooth-wave signal and generating a second primary comparison signal; and
generating the primary control signal based on the first primary comparison signal, the second primary comparison signal and the conduction state of the secondary switch.

15. The control method of claim 12, further comprising:
generating a feedback signal based on a voltage across the auxiliary winding;
sensing a current flowing through the primary switch and generating a current sensing signal;
comparing the current sensing signal with a first primary threshold and generating a first primary comparison signal;
sampling and holding the feedback signal under the control of a primary control signal for controlling the primary switch and generating a sample-and-hold signal;
amplifying an error between the sample-and-hold signal and a second primary threshold and generating a first compensation signal;
selecting one of the first compensation signal and a preset compensation signal as a compensation signal based on the conduction state of the secondary switch;
comparing the compensation signal with a sawtooth-wave signal and generating a second primary comparison signal; and
generating the primary control signal based on the first primary comparison signal and the second primary comparison signal.

16. The control method of claim 12, wherein the step of detecting whether the secondary switch is turned on comprises:
generating a feedback signal based on a voltage across the auxiliary winding;
comparing the feedback signal with a third primary threshold and generating a third primary comparison signal;
timing based on the third primary comparison signal; and
comparing the feedback signal with a fourth primary threshold when the timing period of a primary timer reaches a second predetermined time.

17. The control method of claim 12, wherein the step of detecting whether the secondary switch is turned on comprises comparing a primary current sensing signal indicative of a negative current flowing through the primary switch with a fifth primary threshold.

18. The control method of claim 12, wherein the step of detecting whether the secondary switch is turned on comprises comparing a voltage across the primary switch with a sixth primary threshold.

19. A switching mode power supply, comprising:
a transformer having a primary winding, a secondary winding for providing an output voltage and an auxiliary winding;
a primary switch coupled to the primary winding;
a secondary rectifying diode coupled to the secondary winding;
a secondary switch connected in parallel with the secondary rectifying diode;
means for comparing a voltage across the secondary switch with a first secondary threshold and a second secondary threshold and generating a hysteresis comparison signal;
means for timing based on the hysteresis comparison signal;
means for comparing the voltage across the secondary switch with a third secondary threshold when the timing period of means for timing reaches a first predetermined time;
means for turning ON the secondary switch when the voltage across the secondary switch is less than a third secondary threshold;
means for detecting whether the secondary switch is turned on; and
means for turning on the primary switch when the conduction of the secondary switch is detected.

20. The switching mode power supply of claim 19, further comprising means for turning OFF the secondary switch when the voltage across the secondary switch is larger than a fourth secondary threshold.

* * * * *